United States Patent [19]

Kurakake et al.

[11] Patent Number: 4,628,240
[45] Date of Patent: Dec. 9, 1986

[54] SYNCHRONOUS MOTOR CONTROL SYSTEM

[75] Inventors: Mitsuo Kurakake, Hino; Keiji Sakamoto, Hachioji; Jiro Kinoshita, Yamato, all of Japan

[73] Assignee: Fanuc Ltd., Minamitsuru, Japan

[21] Appl. No.: 673,742

[22] PCT Filed: Mar. 2, 1984

[86] PCT No.: PCT/JP84/00082
§ 371 Date: Nov. 5, 1984
§ 102(e) Date: Nov. 5, 1984

[87] PCT Pub. No.: WO84/03596
PCT Pub. Date: Sep. 13, 1984

[30] Foreign Application Priority Data

Mar. 3, 1983 [JP] Japan .................................. 58-34866

[51] Int. Cl.$^4$ ............................................. H02P 5/40
[52] U.S. Cl. .................................... 318/723; 318/722
[58] Field of Search ......................... 318/811, 721–723

[56] References Cited

U.S. PATENT DOCUMENTS 4,240,020 12/1980 Okuyama et al. ................... 318/800
4,458,192 7/1984 Sakamoto et al. .................. 318/811

Primary Examiner—David Smith, Jr.
Attorney, Agent, or Firm—Staas & Halsey

[57] ABSTRACT

A synchronous motor control system for preventing a torque efficiency reduction on high-speed rotation and acceleration to produce a torque efficiently at all times. The synchronous motor control system detects when inverter drive signals for controlling currents supplied to the synchronous motor exceed a physical saturable quantity of an inverter, and corrects current waveforms applied to the synchronous motor to make sure that they are sine waves at all times.

4 Claims, 5 Drawing Figures

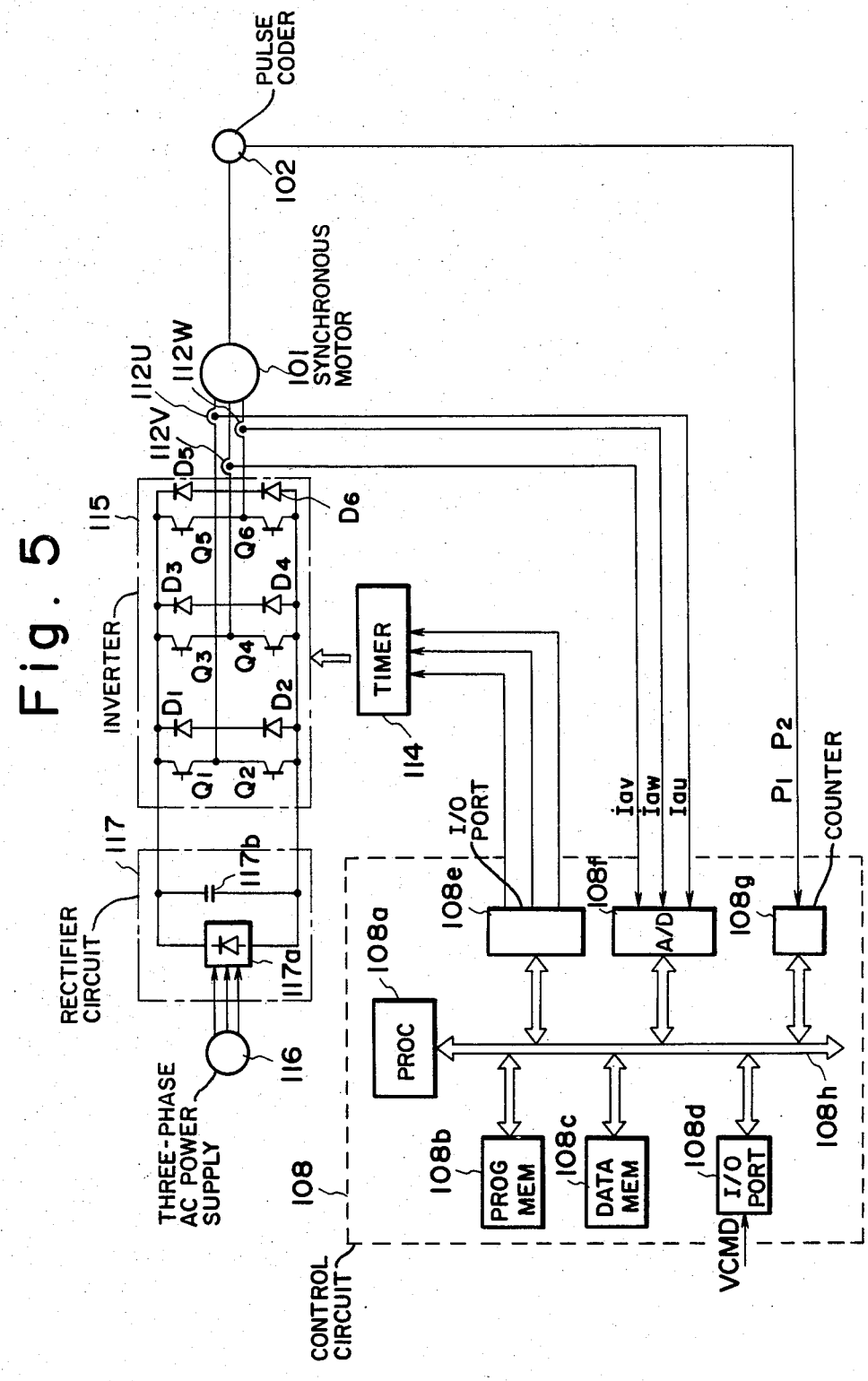

SYNCHRONOUS MOTOR CONTROL SYSTEM

CROSS REFERENCE TO RELATED APPLICATIONS

This application is related to U.S. application Ser. No. 637,220, filed July 23, 1984 and U.S. application Ser. No. 642,664, filed Aug. 17, 1984, both of which are assigned to the asignee of the subject application.

BACKGROUND OF THE INVENTION

The present invention relates to a control system for controlling a synchronous motor to maintain a constant torque, and more particularly to a synchronous motor control system capable of improving torque characteristics of a synchronous motor at high speeds and on acceleration.

Servomotors have found use in a variety of applications. In recent years, there has been developed an AC servomotor, so that a synchronous motor is available as a servomotor. Since a synchronous motor having a permanent magnet used as a rotor is of the brushless type, the motor generates no noise, is simple in construction, and hence is in wide use.

The synchronous motor is required to be controlled to produce a constant torque. To meet this requirement, a technique has been developed for passing a current in phase with an electromotive force induced by a rotor, through an armature winding serving as a stator. Such a technique will be described with reference to FIG. 1 which shows the arrangement of a synchronous motor. A flux density B in a position spaced at an angle $\theta$ from a q-axis of the magnetic field of a rotor 1 which is composed of a permanent magnet is given by:

$$B = Bm \cdot \sin \theta \quad (1)$$

A magnetic flux $\phi$ crossing an a-winding of stator 2 is expressed as follows:

$$\phi = -\phi m \cdot \cos \theta c \quad (2)$$

(where $\phi m$ indicates a magnetic flux on the q-axis of the rotor 1.)

Therefore, an electromotive force $e_1$ induced across the a-winding is given by:

$$e_1 = -(d\phi/dt) = -\phi m \cdot p \cdot \omega m \cdot \sin \theta \quad (3)$$

(where $\theta = P\theta m = P \cdot \omega m \cdot t$.)

Likewise, electromotive forces $e_2$, $e_3$ induced across b- and c-windings of the stator 2 which are disposed in positions spaced $\frac{2}{3}\pi$, $\frac{4}{3}\pi$, respectively, from the a-winding are expressed by:

$$e_2 = -\phi m \cdot P \cdot \omega m \sin (\theta + 2/(3\pi)) \quad (4)$$

$$e_3 = -\phi m \cdot P \cdot \omega m \sin (74 + 4/(3\pi)) \quad (5)$$

Let currents flowing through the armature windings a, b, and c be expressed by $i_1$, $i_2$, $i_3$, and an output torque T of the three-phase synchronous motor is expressed as follows:

$$T = \frac{1}{\omega}(e_1 \cdot i_1 + e_2 \cdot i_2 + e_3 \cdot i_3) \quad (6)$$

By substituting the equations (3), (4), and (5) for the electromotive forces in the equation (6), $$T = -\frac{1}{2}\phi m \cdot p \cdot \omega m \times \{i_1 \cdot \sin\theta + i_2 \cdot \sin(\theta + 2/(3\pi)) + i_3 \cdot \sin(\theta + 4/(3\pi))\} \quad (7)$$

For making the torque T constant, it should not be dependent on the angle $\theta$. By selecting the currents:

$$i_1 = I \sin \theta \quad (8)$$

$$i_2 = I \sin (\theta + 2/(3\pi))$$

$$i_2 = I \sin (\theta + 2/(3\pi))$$

(where I is the amplitude of the current), the torque T of the equation (7) becomes $$T = \frac{1}{2}K\{I \sin^2\theta + I \sin^2(\theta + 2/(3\pi)) + I \sin^2(\theta + 4/(3\pi))\} \quad (9)$$

$$= 3/2 \, KI$$

Therefore, the torque T is constant regardless of the rotational position of the rotor 1.

For effecting such control, it is necessary to detect the angular position of the rotor of the synchronous motor for thereby controlling the value of each armature current.

A drive control device for such a motor includes an inverter at a final stage. Since an inverter has a physical saturable quantity (highest voltage), when a current command in excess of the saturable quantity of the inverter is given (e.g., at the time of operation at a high speed or during acceleration), a current waveform supplied to the synchronous motor is no longer a sine wave. More specifically, as shown in FIGS. 2(A), (B), and (C), the inverter is saturated at a maximum voltage $|V|$, and the current waveform in each of R, S, and T phases approaches a rectangular wave.

On high-speed operation or acceleration, therefore, the constant K in the equation (9) is lowered to reduce the torque efficiency, with the results that no effective torque is produced and smooth rotation is impaired, resulting in noise and vibrations.

To prevent the current waveform supplied to the synchronous motor from reaching the rectangular wave, it would be possible to multiply an effective current command by k ($0 < k < 1$). With such a system, however, it would multiplied by $\sin \theta$, and the difference between the product and a current value would be determined and issued as a current command to the inverter. Therefore, it would be difficult to ensure accurately that the output to the inverter would be within the saturable quantity. Alternatively, if the constant k were small, the synchronous motor would fail to produce a sufficient torque.

SUMMARY OF THE INVENTION

It is an object of the present invention to provide a synchronous motor control system capable of preventing torque efficiency from being lowered at the time of high-speed operation and acceleration, and producing a torque efficiently at all times.

According to the present invention, there is provided a synchronous motor control system including a detector for detecting a rotational angle of a synchronous motor, a control circuit for generating a sine value corresponding to the rotational angle detected by the detector and for multiplying an effective current command by the sine value to produce an inverter drive signal in each phase, and an inverter for giving a current command to an armature winding of the synchronous motor according to the inverter drive signal from the control circuit. The control circuit corrects the inverter drive signal in any phase when the inverter drive signal is in excess of a physical saturable quantity of the inverter in that phase, and corrects the inverter drive signals of the other phases based on the corrected quantity.

In accordance with the present invention, the control circuit corrects the inverter drive signals so that the sum of currents flowing in the phases of the synchronous motor according to the inverter drive signals for the respective phases will be zero.

With the present invention, when an inverter is driven and sine waves to apply currents to a synchronous on the basis of the product of effective current commands motor, the control circuit detects when inverter drive signals exceed a physical saturable quantity of the inverter, and corrects the inverter drive signals. Since no inverter drive signals in excess of the saturable quantity of the inverter are applied, current waveforms applied to the synchronous motor are sine waves at all times whereby the torque efficiency will not be reduced and smooth rotation of the motor will be ensured. Furthermore, whether a waveform distortion is produced or not is predicted by a final stage output to be applied to the inverter, so that the accuracy of detection is high and torque reduction is also prevented thereby. In addition, when an inverter drive signal in one phase reaches the saturable quantity and is corrected, inverter drive signals in the other phases are also corrected, so that the sum of currents in the phases will be zero at all times.

BRIEF DESCRIPTION OF THE DRAWINGS

FIG. 5 is a block diagram of an embodiment of a synchronous motor control system in accordance with the present invention.

DESCRIPTION OF THE PREFERRED EMBODIMENT

The present invention will be described in greater detail with reference to the accompanying drawings.

Figures 2, 3:
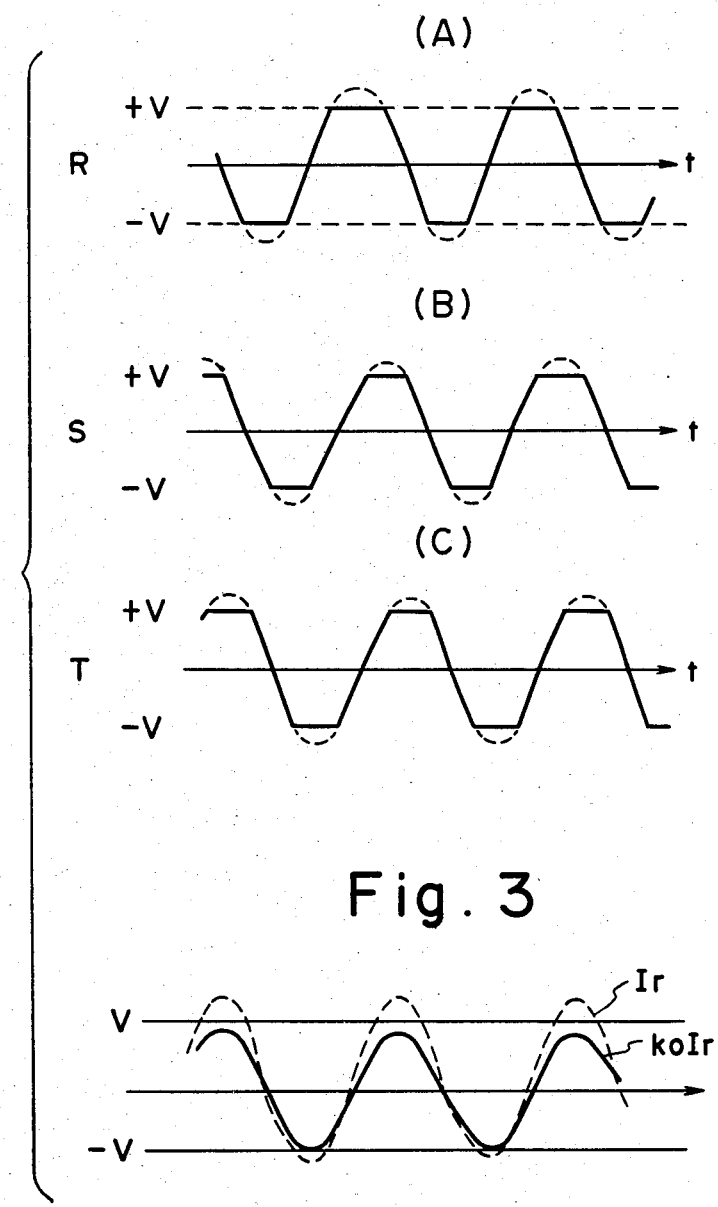
FIG. 2 is a diagram for explaining problems with a conventional control system.
FIG. 3 is a diagram for explaining the principle of the present invention.

FIG. 3 is a diagram for explaining the principle of the present invention. According to the present invention, a current command $I_r$ in excess of the saturable quantity $|V|$ of an inverter is reduced so that the current waveform will not be saturated, thus maintaining the current waveform as a sine wave as indicated by $koI_r$ at all times.

Figure 1:
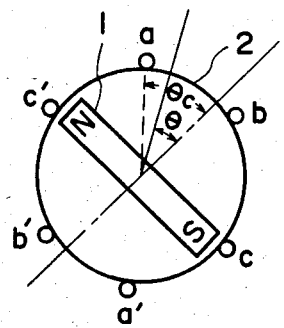
FIG. 1 is a diagram of a synchronous motor to which the present invention relates.
Figure 4:
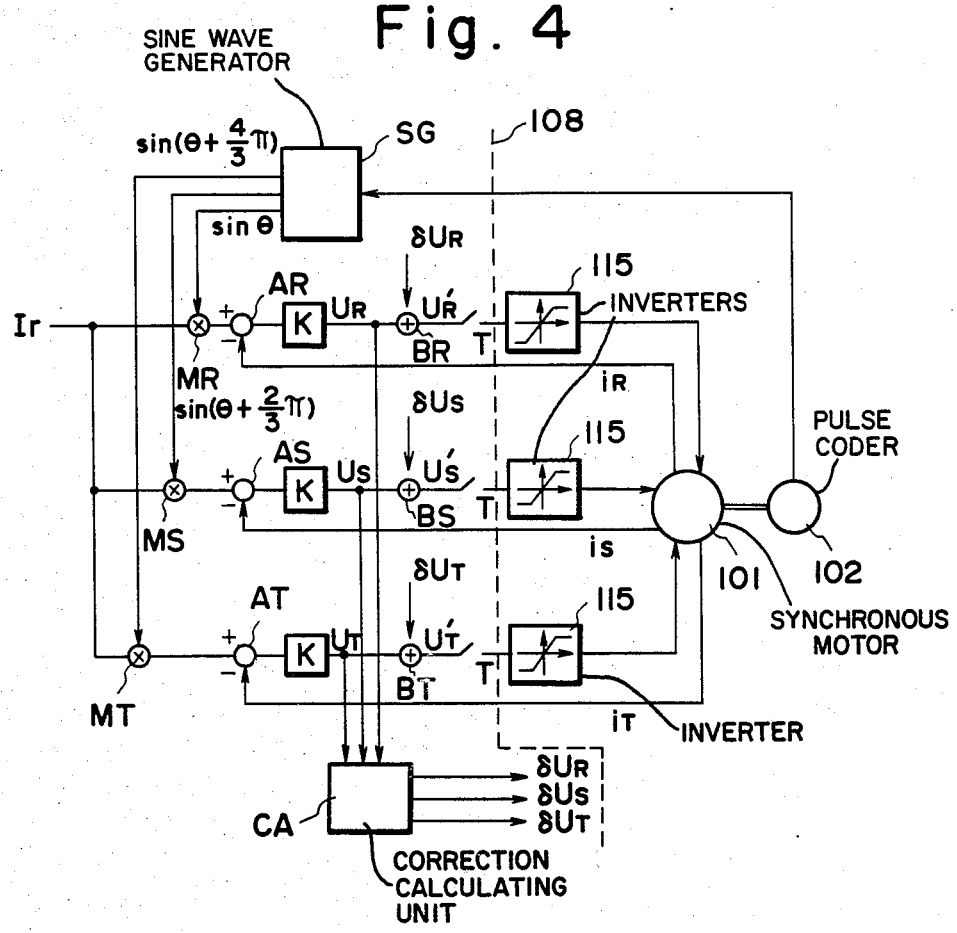
FIG. 4 is a diagram for illustrating the principle of operation according to the present invention.

FIG. 4 is a diagram for explaining the principle of operation of the present invention. Designated in FIG. 4 at 101 is a synchronous motor. Inverters 115 give current commands to armature windings of the synchronous motor 101, and a control circuit 108 issues inverter drive signals. The control circuit 108 effects arithmetic operations through a speed control loop and a current control loop. Denoted at 102 is a pulse coder coupled to a rotatable shaft of the synchronous motor 101 for producing a positional code indicative of the position of a field pole of the synchronous motor 101 and a rotational pulse each time the synchronous motor 101 is angularly moved through a certain angle.

The control circuit 108 includes multipliers MR, MS, MT for multiplying an effective current command $I_r$ derived from a positional error, the positional code from the pulse coder 102, and sine waves of $\sin\theta$, $\sin(\theta+2/(3\pi))$, and $\sin(\theta+4/(3\pi))$ generated from a sine wave generator SG based on the rotational pulse, for producing current commands $I_R$, $I_S$, $I_T$ for R, S, T phases, respectively. These current commands $I_R$, $I_S$, $I_T$ are the same as $i_1$, $i_2$, $i_3$ in the equations (8). Subtractors AR, AS, AT determine the differences between the current commands $I_R$, $I_S$, $I_T$ and actual phase currents $i_R$, $i_S$, $i_T$ of the phases of the synchronous motor 101, and the differences are multiplied by a predetermined coefficient K to produce inverter drive commands $U_R$, $U_S$, $U_T$. The inverter drive commands $U_R$, $U_S$, $U_T$ are applied to a correction calculating unit CA which effects the following arithmetic operations: The inverter drive commands $U_R$, $U_S$, $U_T$ are compared with a saturable quantity $|V|$ of the inverters 115. If $|U_R|$, $|U_S|$, $|U_T| > V$, then the correction calculating unit CA produces no correction signal. If any one of $|U_R|$, $|U_S|$, $|U_T|$ is greater than V, then the correction calculating unit CA issues a correction signal to that phase.

For example, if the inverter drive command $|U_S|$ is greater than V, then the correction calculating unit CA calculates a correction signal $\delta U_R$ for lowering the effective command $I_r$ to $koI_r$ as shown in FIG. 3, as follows:

$$U'_R = K(I_r \sin\theta - i_R) + \delta U_R \qquad (10)$$

Since $U'_R$ reduces the effective command $I_r$ to $koI_r$, $$U'_R = K(koI_r \sin\theta - i_R) \qquad (11)$$

From the equations (10) and (11), $$\delta U_R = K(1-ko)I_r \sin\theta \qquad (12)$$

Since $ko$ is constant, $\delta \cdot U_R$ can easily be calculated. When the effective command is lowered for only the R-axis, it becomes out of balance with the other phases, thereby producing a high-frequency torque component. Therefore, the correction calculating unit CA corrects the effective command $I_r$ as if it is reduced to $koI_r$ for the other phases S, T. More specifically, the correction calculating unit CA makes corrections for the S, T phases so that the sum of the currents flowing through the phases R, S, T of the synchronous motor will be zero.

$$U'_S = K(koK_r \sin(\theta + 2/(3\pi)) - i_S) \qquad (13)$$

$$= U_S - K(1-ko) I_r \sin(\theta + 2/(3\pi))$$

$$= U_S - \delta; U_R \times \sin(\theta + 2/(3\pi))/\sin\theta$$

$$\therefore \delta U_S = -\delta U_R \times \sin(\theta + 2/(3\pi))/\sin\theta \qquad (14)$$

$$U'_T = K(koK_r \sin(\theta + 4/(3\pi)) - i_T) \qquad (15)$$

$$= U_T - K(1-ko) I_r \sin(\theta + 4/(3\pi))$$

$$= U_T - \delta \cdot U_R \times \sin(\theta + 4/(3\pi))/\sin\theta$$

$$\therefore \delta U_T = -\delta U_R \times \sin(\theta + 4/(3\pi))/\sin\theta \qquad (16)$$

The correction signals $\delta U_R$, $\delta U_S$, $\delta U_T$ are added by adders BR, BS, BT to the inverter drive signals $U_R$, $U_S$, $U_T$, and corrected inverter drive commands $U'_R$, $U'_S$, $U'_T$ output by the adders are as indicated by the equations (10), (13), (15). The currents given by the inverters 115 to the synchronous motor 101 now have a sine wave as indicated by koIr in FIG. 3, wherein the effective current command Ir is multiplied by ko. Therefore, the torque characteristics at the time of high-speed rotation and acceleration are improved. When the commands $|U_S|$, $|U_T|$ for the other phases S, T are greater than V, corrected inverter drive commands can be determined in the same manner.

T, T, T indicate sampling periods of the current loops in the control circuit 108. The corrected inverter drive commands $U'_R$, $U'_S$, $U'_T$ are applied to the inverters 115 in each period T. The above corrective action can be effected in each sampling period of the speed control loops.

An arrangement of a synchronous motor control system for realizing the present invention will now be described. FIG. 5 is a block diagram of an embodiment of the synchronous motor control system. Identical parts in FIG. 5 are denoted by the identical reference characters in FIG. 4. The control circuit 108 comprises a processor 108a for effecting arithmetic operations according to a motor control program; a program memory 108b for storing the motor control program; a data memory 108c for storing data; an input/output port 108d for receiving commands from an external source such as a numerical control apparatus; an input/output port 108e for issuing a pulse-width-modulation command to a timer circuit 114, described below; an analog-to-digital (AD) converter 108f for converting actual phase currents Iau, Iav, Iaw from current detectors 112U, 112V, 112W, described below, into digital values; a counter 108g for being initially loaded with a positional code indicative of a rotational position α of the field pole of the synchronous motor 101, and for counting rotational pulses P₁, P₂ generated from the pulse coder 102 each time the synchronous motor 101 is angularly moved a predetermined angle; and an address-/data bus 108h connecting the above components.

The current detectors 112U, 112V, 112W detect the actual phase currents of the phases and supply the current signals to the AD converter 108f in the control circuit 108. The timer circuit 114 issues a pulse-width-modulation signal having a width or duration dependent on a pulse-width-modulation command from the control circuit 108 to the inverter 115.

The inverter 115 is composed of six power transistors Q₁–Q₆ and six diodes D₁–D₆, and is supplied with a DC voltage from a rectifier circuit 117. The power transistors Q₁–Q₆ are turned on and off by the pulse-width-modulation signal from the timer circuit 114 to provide drive currents to the synchronous motor 101.

The rectifier circuit 117 is composed of a diode group 117a and a capacitor 117b for rectifying three-phase alternating currents from an external three-phase AC power supply 116 into direct currents to impress a DC voltage on the inverter 115.

Operation of the synchronous motor control system shown in FIG. 5 will be described with reference to a mode in which a speed command is increased while the synchronous motor is rotating at a certain speed. Since the synchronous motor 101 is rotating, the counter 108g has been loaded with a positional code from the pulse coder 102 immediately before the synchronous motor 101 starts rotating, and has been counting rotational pulses P₁, P₂ generated as the synchronous motor 101 rotates. Therefore, the counter 108g is indicative of the rotational position of the field pole of the synchronous motor 101 at all times. Since the period of the rotational pulses P₁, P₂ is proportional to the speed of the synchronous motor 101, increments in the count of the counter 108g over a prescribed time interval correspond to the rotational speed of the synchronous motor 101.

(1) For rotating the synchronous motor 101 at a desired rotational speed Vc, the control circuit 108 receives a speed command VCMD from an external source, such as a numerical control apparatus, through the input/output port 108d, and the speed command VCMD is fed through the address/data bus 108h to the processor 108a.

(2) The process 108a reads a count from the counter 108g through the address/data bus 108h, calculates the difference between a previous count and the present count, and divides the difference by a sampling period T to calculate an actual speed Va. The actual speed Va may be calculated by providing a counter which measures the periods of the rotational pulses P₁, P₂ and causing the processor 108a to read the counter. (The step of calculating an actual speed)

(3) The processor 108a effects the following arithmetic operation using the speed command Vc and the actual speed Va to determine an amplitude command (effective current command) Ir:

$$Ir = K_1(Vc - Va) + K_2 \sum_{i=1}^{k-1}(Vc - Va) \quad (17)$$

Ir in the equation (17) corresponds to the amplitude of an armature current. As Ir is increased, a greater torque is produced, and the actual speed of the synchronous motor 101 is thereby brought to the command speed. (The step of calculating the speed loop)

(4) Then, the processor 108a reads a count θ from the counter 108g through the address/data bus 108h. The processor 108a searches a conversion table of count values $\theta - \sin \theta$, $\sin(\theta + 2/(3\pi))$ stored in the data memory 108c and obtains digital values of $\sin \theta$, $\sin(\theta + 2/(3\pi))$ corresponding to the rotational angle θ. (The step of generating a sine wave)

(5) The processor 108a multiplies the amplitude command Ir determined in the speed loop calculating step (3) and the digital values of $\sin \theta$, $\sin(\theta + 2/(3\pi))$ to obtain two-phase current commands $I_R$, $I_S$:

$I_R = Ir \cdot \sin \theta$ $I_S = Ir \cdot \sin(\theta + 2/(3\pi))$

Then, the processor 108a derives a current command $I_T$ from the two-phase current commands $I_R$, $I_S$ according to the following equation:

$$I_T = -I_R - I_S = Ir \cdot \sin(\theta + 4/(3\pi)) \quad (19)$$

(The step of calculating a current command)

If a conversion table of $\theta - \sin \theta$, $\sin(\theta + 2/(3\pi))$, $\sin(\theta + 4/(3\pi))$ is employed in the sine wave generating step (4), then the arithmetic operation of the equation (19) is unnecessary.

(6) Then, the processor 108a reads, through the bus 108h, digital values converted by the AD converter 108f from the actual phase currents Iav, Iaw, Iau detected by the current detectors 112U, 112V, 112W, determines the differences bewteen the three-phase current commands $I_R$, $I_S$, $I_T$ and the actual phase currents Iav, Iaw, Iau, and multiplies the differences by a prescribed amplification coefficient K to produce digital inverter drive signals $U_R$, $U_S$, $U_T$. The above step is a step of calculating the current loop.

(7) Thereafter, the processor 108a multiplies the actual speed Va obtained in the speed loop calculating step (3) by a coefficient kf to produce a speed compensation output $V\overline{CO}$, and subtracts the speed compensation output $V\overline{CO}$ from the inverter drive signals $U_R$, $U_S$, $U_T$ to produce compensated inverter drive signals $U_R$, $U_S$, $U_T$. The current loop is thus prevented from a gain reduction which would otherwise be caused by a counterelectromotive force due to the actual speed of the synchronous motor 101. (The step of compensating the current loop)

(8) The processor 108a compares, on a digital basis, the inverter drive signals $U_R$, $U_S$, $U_T$ with a maximum voltage V of the inverter to ascertain whether the magnitudes of the inverter drive signals are in excess of the maximum voltage V. If any one of the inverter drive signals $U_R$, $U_S$, $U_T$ exceeds the maximum voltage V, then the processor 108a effects the foregoing corrective arithmetic operations. For example, if $|U_R|>V$, then the processor 108a calculates the corrective quantity $\delta U_R$ from the current command $I_R$ in the current command calculating step (5) according to the equation (12). Then, the processor 108a calculates $\delta U_S$, $\delta U_T$ according to the equations (14), (16). (The step of calculating the corrective quantity)

(9) Then, the processor 108a effects the arithmetic operations of the equations (10), (13), (15), using the corrective quantities, on the inverter drive signals $U_R$, $U_S$, $U_T$ to calculate corrected inverter drive signals $U'_R$, $U'_S$, $U'_T$ (The step of correcting torques)

The torque correcting step may correct torques in the present period according to the corrective quantities $\delta U_R$, $\delta U_S$, $\delta U_T$, one period earlier, of the speed loop.

(10) The processor 108a produces pulse-width-modulation commands tu, tv, tw from the values of the corrected inverter drive signals $U'_R$, $U'_S$, $U'_T$. That is, the processor 108a calculates the pulse-width-modulation commands tu, tv, tw indicative of pulse widths dependent on the corrected inverter drive signals $U'_R$, $U'_S$, $U'_T$. (The step of pulse-width-modulation)

(11) The processor 108a delivers the pulse-width-modulation commands tu, tv, tw through the address-/data bus 108h and the input/output port 108e to the timer circuit 114. The timer circuit 114 issues pulse-width-modulation signals having time durations dependent on the pulse-width-modulation commands tu, tv, tw to the power transistors $Q_1$–$Q_6$ of the inverter 115. The power transistors $Q_1$–$Q_6$ are now turned on and off to enable the inverter 115 to supply three-phase currents to the synchronous motor 101.

The processor 108a executes the current loop calculations in the steps (4)–(11) in each sampling period T, and also executes the speed loop calculations in the steps (1)–(3) in each period nT (n>1) according to the control program in the program memory 108b for controlling the synchronous motor 101 to rotate the same at a command speed.

While in the above embodiment the speed loop calculations and the current loop calculations are executed by one processor 108a, they may be executed by separate processors, respectively.

Although a certain preferred embodiment has been shown and described, it should be understood that many changes and modifications may be made therein without departing from the scope of the appended claims.

As described above, a synchronous motor control system of the present invention detects when inverter drive signals for controlling currents supplied to a synchronous motor exceed a physical saturable quantity of an inverter, and maintains current waveforms applied to the synchronous motor as sine waves at all times. The synchronous motor control system is suitable for controlling a synchronous motor controlled by a numerical control apparatus in a tool machine or the like.

We claim:

1. A synchronous motor control system for controlling a synchronous motor, comprising:
   a detector, coupled to the synchronous motor, for detecting a rotational angle of the synchronous motor;
   a control circuit, coupled to said detector, for generating a sine value corresponding to the rotational angle detected by said detector and for multiplying an effective current command by the sine value to produce an inverter drive signal in each phase; and
   an inverter, having a physical saturable quantity and coupled to said control circuit and the synchronous motor, for providing current commands to armature windings of the synchronous motor in dependence upon the inverter drive signals from said control circuit, said control circuit determining, for each phase, when the corresponding inverter drive signal is in excess of the physical saturable quantity of said inverter in that phase, and correcting that phase of the inverter drive signal which is provided to said inverter by a correction quantity, said control circuit correcting the inverter drive signals in the other phases based on the correction quantity, said control circuit executing the corrections so that the waveforms of the current commands provided to the armature windings of the synchronous motor are always sine waves.

2. A synchronous motor control system according to claim 1, wherein said control circuit corrects the inverter drive signals so that the sum of currents flowing in the phases of the synchronous motor, based on the inverter drive signals for the respective phases, will be zero.

3. A synchronous motor control system, connected to receive an effective current command, for controlling a synchronous motor, comprising:
   detecting means for detecting the rotational angle of the synchronous motor and for generating a detection signal;
   control means, coupled to said detector, for generating inverter drive commands based on the detection signal and the effective current command, and for providing inverter drive signals based on the inverter drive commands; and
   inverter means, coupled to said control means and the synchronous motor, for receiving the inverter drive signals and for providing a current command to each armature winding of the synchronous motor in accordance with the corresponding one of the inverter drive signals, said inverter means having a physical saturable quantity, said control means determining, for each of the inverter drive commands, whether the inverter drive command is in excess of the physical saturable quantity of said inverter, and correcting one of the inverter drive commands if it is determined to be in excess of the physical saturable quantity, to provide the corrected inverter drive command as the corresponding one of the inverter drive signals, said control means correcting the other inverter drive commands based on the corrected inverter drive command, said control circuit executing the corrections so that the waveforms of the current commands provided to the armature windings of the synchronous motor are always sine waves.

4. A synchronous motor control system according to claim 3, wherein said control means corrects the inverter drive commands so that the sum of currents flowing in the phases of the synchronous motor, based on the inverter drive signals for the respective phases, will be zero.

* * * * *

UNITED STATES PATENT AND TRADEMARK OFFICE
CERTIFICATE OF CORRECTION

PATENT NO. : 4,628,240
DATED : DECEMBER 9, 1986
INVENTOR(S) : MITSUO KURAKAKE ET AL.

It is certified that error appears in the above-identified patent and that said Letters Patent is hereby corrected as shown below:

Col. 1, line 59, (formula (5)), "74" should be --$\theta$--.

Col. 3, line 16, after "driven" insert --on the basis of the product of effective current commands--;
  line 17, delete "on the basis of the product of effective current";
  line 18, delete "commands".

Col. 4, line 22, ">" should be --<--;
  line 43, "$\delta . U_R$" should be --$\delta U_R$--;
  line 65, "$\delta . U_R$" should be --$\delta U_R$--.

Signed and Sealed this

Second Day of January, 1990

Attest:

JEFFREY M. SAMUELS

*Attesting Officer*     *Acting Commissioner of Patents and Trademarks*